July 11, 1961     A. CANDELISE     2,991,767

AIR INJECTION SYSTEM FOR AN INTERNAL COMBUSTION ENGINE

Filed March 4, 1960

INVENTOR.

Alfred Candelise

BY

D. D. McGraw

ATTORNEY

United States Patent Office 2,991,767
Patented July 11, 1961

2,991,767
AIR INJECTION SYSTEM FOR AN INTERNAL COMBUSTION ENGINE
Alfred Candelise, Flint, Mich., assignor to General Motors Corporation, Detroit, Mich., a corporation of Delaware
Filed Mar. 4, 1960, Ser. No. 12,847
2 Claims. (Cl. 123—26)

The invention relates to a system for injecting compressed air into the combustion chambers of an internal combustion engine. As disclosed in my co-pending application S.N. 12,857, filed March 4, 1960, a system for injecting compressed air into the engine combustion chambers during a portion of the power stroke will result in the substantial elimination of the presence of carbon monoxide in the exhaust gases by providing the complete burning of the unburned or partially burned hydrocarbons normally found in the combustion chambers after the combustion step is completed. Such unburned hydrocarbons are most prevalent when the engine is being operated at idle and low speed conditions since a richer fuel mixture is required at these times. The introduction of additional air provides sufficient oxygen to complete the combustion process at a time when the gases are still within the combustion chambers and able to deliver additional power to the engine pistons thus also resulting in increased engine power and efficiency.

The system disclosed and claimed in my co-pending application noted above provided various mechanisms for introducing air through the spark plug openings leading to the combustion chambers. It has been found that, under some conditions, it is preferable to inject the air into the combustion chambers at points other than the spark plug openings. The system herein disclosed and claimed utilizes a poppet valve or check valve in a separate introducing mechanism which may introduce air at a point adjacent the combustion chamber spark plug or in another portion of the combustion chamber walls. The air introducing mechanism may be readily installed and removed for maintenance purposes. Its operation may be timed by an air timing and distribution valve similar to that disclosed and claimed in my co-pending application referred to above. One modification of the introducing mechanism permits introduction of air laterally of the combustion chamber to provide more effective mixing of the air with the combustion gases so as to obtain better combustion as a result of the air injection step.

Figure 1:
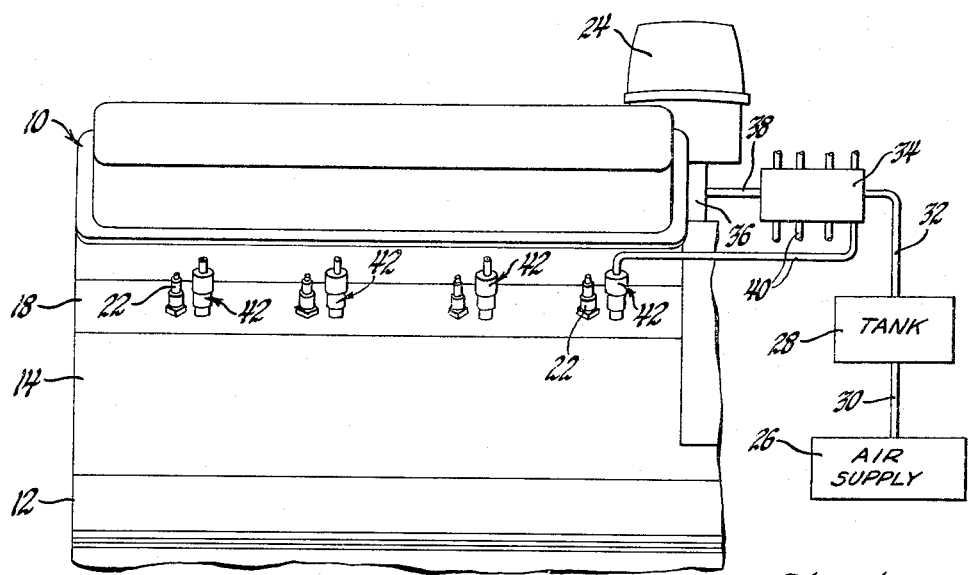
Figure 2:
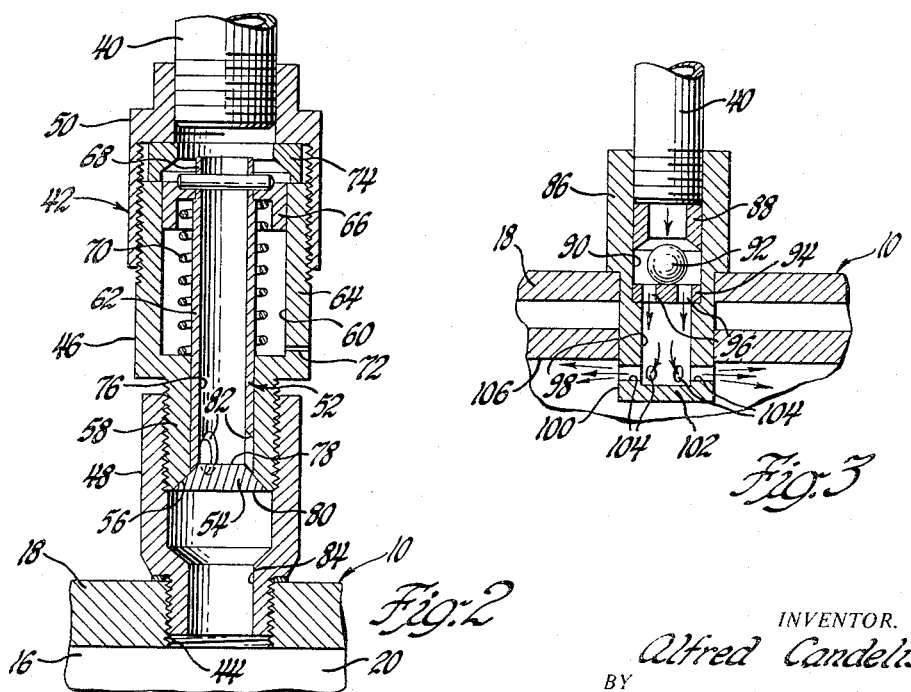
Figure 3:
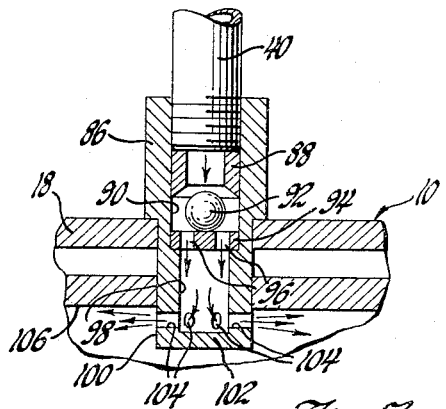

In the drawing:
FIGURE 1 is a schematic presentation of a system embodying the invention as installed on a V-8 type engine.
FIGURE 2 is a cross section view of one of the air introducing mechanisms used in the system of FIGURE 1.
FIGURE 3 is a cross section view of a modified air injection mechanism which may be used in the system of FIGURE 1.

The engine 10 on which the system embodying the invention is installed may include an engine block 12 having banks 14 of engine cylinders 16. Pistons may be received within the cylinders 16 for reciprocation as is well known in the art. Cylinder head 18 may be provided for each bank 14 and cooperate with cylinders 16 to define combustion chambers 20. Spark plugs 22 may be provided for each combustion chamber 20 in order to ignite the fuel-air mixture introduced through the engine induction system. The engine 10 may have the usual engine distributor 24 which is driven in the well known manner from the engine camshaft in timed relation to the engine crankshaft so as to time the ignition sparks of spark plugs 22 in accordance with the cycle of operation of each engine cylinder 16.

The system includes a source of compressed air 26 which may be an air compressor having characteristics similar to those disclosed in my above noted application. Compressed air may be furnished to tank 28 through an air conduit 30 leading from the air supply 26. Another conduit 32 connects tank 28 with the air distribution and timing valve mechanism 34 and maintains a supply of compressed air to that mechanism. Valve mechanism 34 may be of the type disclosed in my co-pending application noted above and may be driven from the distributor drive 36 by a drive member 38 so that the valve operates in timed relation to the engine 10. A plurality of compressed air delivery conduits 40 are connected with valve mechanism 34 to receive compressed air therefrom in proper time with the engine 10 so as to distribute the air to each engine combustion chamber 20 for the desired duration and at the desired time. In order to introduce air into each combustion chamber, each such chamber is provided with an air introducing mechanism 42.

One form of air introducing mechanism 42 is illustrated in detail in FIGURE 2. The mechanism is shown as being installed through a threaded opening 44 in the cylinder head 18 so that opening 44 communicates with the combustion chamber 20. The mechanism 42 includes a valve body 46, adapter 48 and means 50 for securing the discharge end of conduit 40 to the inlet end of the mechanism. A poppet type valve 52 is received within valve body 46 so that its head 54 seats on valve seat 56 formed at the discharge end 58 of valve body 46. Valve body end 58 is secured to the adapter 48 by threads or other suitable means. The upper end of valve body 46 has a valve actuating piston chamber 60 formed therein through which the hollow valve stem 62 extends. The wall 64 of chamber 60 acts as a cylinder in which the valve actuating piston 66 reciprocates. Piston 66 is secured to the upper end 68 of hollow valve stem 62 so that downward movement of the piston results in movement of the valve stem to unseat the valve head 54. Valve closing spring 70 is received within the chamber 60 and acts against piston 66 to urge the valve into the seated position. A vent 72 may be provided in the portion of chamber 60 underneath piston 66 to prevent the entrapment of air from effecting the operation of the valve.

A seal 74 is positioned intermediate the upper end of valve body 46 and the conduit connecting means 50 so as to prevent the leakage of air. Compressed air conduit 40 delivers air under pressure to the upper end of chamber 60 so that the air acts on piston 66 when valve mechanism 34 connects compressed air with the conduit 40. The air also passes through the valve stem passage 76 and acts on the inner surface 78 of the valve head 54. The force exerted by the compressed air overcomes the force of valve closing spring 70 and also the force of the gases in combustion chamber 20 act on the outer surface 80 of the valve head 54 so as to permit the flow of compressed air through valve stem openings 82 and between valve head 54 and valve seat 56. The air then flows through adapter passage 84 and into the combustion chamber 20. When the compressed air being supplied through conduit 40 is cut off by mechanism 34, spring 70 moves the valve upwardly so that it is seated and prevents gases under pressure within the cylinder 16 from entering the air injection system while the engine cylinder is passing through the exhaust, intake and compression strokes of its cycle.

The modified air introduction mechanism shown in FIGURE 3 includes a housing 86 which may be press fitted or threaded or otherwise secured through the cylinder head 18 of the engine 10 so that it may introduce air into the engine combustion chamber. The compressed air delivery conduit 40 is connected to the upper end of housing 86 and may abut the valve seat member 88. Member 88 may be press-fitted into housing passage 90 and positioned to provide a seat for ball check valve 92. A valve retainer disk 94 may be positioned in the lower end of housing passage 90 so that valve 92 is retained therein. Several passages 96 may be formed through disk 94 to permit air to pass from conduit 40 around valve 92 and into the lower housing passage 98 when the valve is open. The lower end 100 of housing 86 is closed at 102 so that passage 98 cannot discharge air downwardly. Several radially extending ports 104 are provided in the side wall of housing end 100 at the end of passage 98 so that the air may be discharged generally parallel to the inner wall 106 of the cylinder head 18. It has been found that when air is discharged laterally of the combustion chamber and therefore generally parallel to the upper end of the engine piston, more complete combustion is obtained with the same amount of injected air. The construction of FIGURE 3 therefore accomplishes this result. Other types of check valves such as the check valve and valve actuating assembly of FIGURE 2 may be used in such an assembly if desired.

What is claimed is:

1. In combination with an internal combustion engine having cylinders formed therein to provide combustion chambers and means driven in timed relation with said engine, an air injection system comprising a source of compressed air and air distribution and timing valve mechanism driven by said timed means, means for introducing air into said combustion chambers and conduits connecting said air distribution and valve mechanism with said air introducing means, said valve mechanism providing compressed air to each of said air introducing means during the expansion stroke of each engine cylinder, each of said air introducing means comprising a valve housing in comunication with one of said combustion chambers and receiving air from one of said conduits and having a valve therein controlling the admission of said air from said conduits into said combustion chamber, and said valve body having the lower end thereof projecting into said combustion chamber and having ports formed therein and discharging compressed air only laterally of said combustion chamber.

2. In a compressed air injection system for introducing compressed air into the combustion chambers of an internal combustion engine through the engine cylinder head thereof during portions of the expansion strokes of the engine operating cycles, a source of compressed air, compressed air distribution and timing mechanism operable in timed relation with the engine operating cycles, means mountable in the engine cylinder head and extending into each of the combustion chambers for introducing timed compressed air from said mechanism into said combustion chambers, each of said means comprising a valve housing having passage means in communication with said combustion chamber and connected with said mechanism and having a valve therein for controlling air admission into a combustion chamber, said passage means having a plurality of arcuately spaced discharge openings in the portion of said means extending into the combustion chamber for discharging compressed air only laterally of the combustion chamber and generally parallel to the inner wall of the cylinder head.

References Cited in the file of this patent

UNITED STATES PATENTS

| 1,799,761 | Pew | Apr. 7, 1931 |
| 2,011,986 | Schwarz | Aug. 20, 1935 |